Sept. 7, 1943.  R. E. REASON  2,329,084
APPARATUS FOR MEASURING AND/OR INDICATING SURFACE ROUGHNESS
Filed Feb. 18, 1941   7 Sheets-Sheet 1

Inventor
R.E. REASON
by Blair + Kilcoyne
Attorney

Sept. 7, 1943. R. E. REASON 2,329,084
APPARATUS FOR MEASURING AND/OR INDICATING SURFACE ROUGHNESS
Filed Feb. 18, 1941 7 Sheets-Sheet 2

Inventor
R. E. REASON
by Blair & Kilcoyne
Attorney

Sept. 7, 1943.  R. E. REASON  2,329,084
APPARATUS FOR MEASURING AND/OR INDICATING SURFACE ROUGHNESS
Filed Feb. 18, 1941  7 Sheets-Sheet 6

Inventor
R.E.REASON
by Blair+Kilcoyne
Attorney

Inventor
R. E. REASON
by Blair + Kilcoyne
Attorney

Patented Sept. 7, 1943

2,329,084

UNITED STATES PATENT OFFICE 2,329,084

APPARATUS FOR MEASURING AND/OR INDICATING SURFACE ROUGHNESS

Richard Edmund Reason, Leicester, England, assignor to Kapella Limited, Leicester, England, a company of Great Britain Application February 18, 1941, Serial No. 379,536
In Great Britain February 1, 1940

4 Claims. (Cl. 73—51)

This invention relates to apparatus for measuring and/or indicating the degree of roughness of a surface, and is more especially concerned with an improved pick-up unit for use in such apparatus. Whilst in some instances a magnified graphic record of the surface contour, as would be given for example by a pen recorder, is desired, it will suffice in other instances to obtain a measure of the average roughness of the surface.

The pick-up unit according to the present invention comprises a casing or framework which can be located in any chosen position relatively to the surface under investigation, a pick-up head carried thereby, and means for driving the pick-up head over the surface at any of two or more different speeds. This arrangement enables the same apparatus to be used at will either for operating a pen recorder or like instrument with the relatively slow speed of traverse of the pick-up head suitable thereto or for operating an "average" meter for which a relatively high speed of traverse is desirable.

Conveniently the pick-up head comprises a presser foot engaging with the surface over an appreciable area, a stylus or like member projecting through the presser foot and movable relatively thereto in accordance with the surface roughness as the pick-up head is traversed across the surface, and means responsive to such relative movement for actuating a measuring or indicating instrument. Such means may comprise a differential electromagnetic device which acts to control or modulate the electrical output from a source of alternating current having a frequency high as compared with the principal frequencies in the relative movement and thereby actuates the measuring or indicating instrument.

Means are preferably provided for automatically stopping the drive after the pick-up head has travelled a predetermined distance. Thus for example when the pick-up head is driven from an electric motor or solenoid through variable speed gearing, the circuit to the motor or solenoid may be controlled by contacts operated by the movement of the head or of one of the elements through which the drive is transmitted to the head.

The driving means may be arranged in various ways. Thus the pick-up head may be driven thereby in one direction only, means such as a ratchet or equivalent device being provided to facilitate quick resetting to the starting position. Alternatively a rotary member, such for example as a cam, may be incorporated in the drive and may be so arranged as to transmit the drive to the pick-up head in one direction for measuring or indicating purposes during the major portion of one revolution, the remaining portion of the one revolution being utilised for a relatively quick resetting movement of the pick-up head to the starting position.

A preferred construction of pick-up unit according to the invention and a modification thereof are illustrated by way of example in the accompanying drawings, in which Figure 10 is a front elevation of further electrical contacts employed in the unit.

In the preferred construction the pick-up unit is mounted on an adjustable stand so that it can be fixed in any desired position thereon for cooperation with the surface under investigation. This stand may take various forms but in the example illustrated comprises a base plate A, on which the member whose surface is to be examined can be supported. Adjustably mounted on a horizontal slideway $A^1$ across the stand A is a vertical-shaped bar $A^2$ on which can slide a carriage B to which the casing $B^1$ of the unit is secured by bolts $B^2$. The vertical bar $A^2$ is provided with a rack $A^3$, with which engages a pinion $B^3$ on the carriage B. This pinion is mounted on a spindle passing through the back and front cover plates $B^4$, $B^5$ of the casing and is operated by a hand knob $B^6$ on the front end of the spindle. A counterweight $A^4$, connected to the carriage B by ropes $A^5$ passing over a pulley $A^6$ at the top of the vertical bar $A^2$, is provided to balance the weight of the carriage B and the pick-up unit. The unit can be clamped in any desired position on the bar $A^2$ by a clamping device operated by a finger lever $B^7$ mounted on the front cover plate $B^5$ of the casing.

Figure 5:
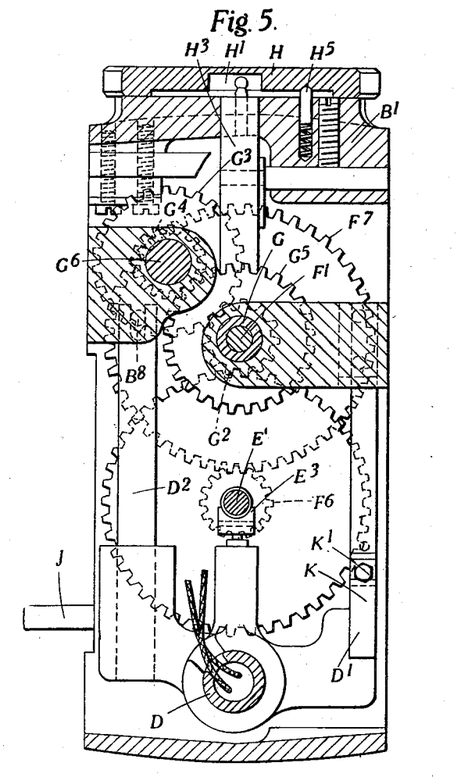
Figure 5 is a vertical section on the broken line 5—5 of Figure 3.
Figure 6:
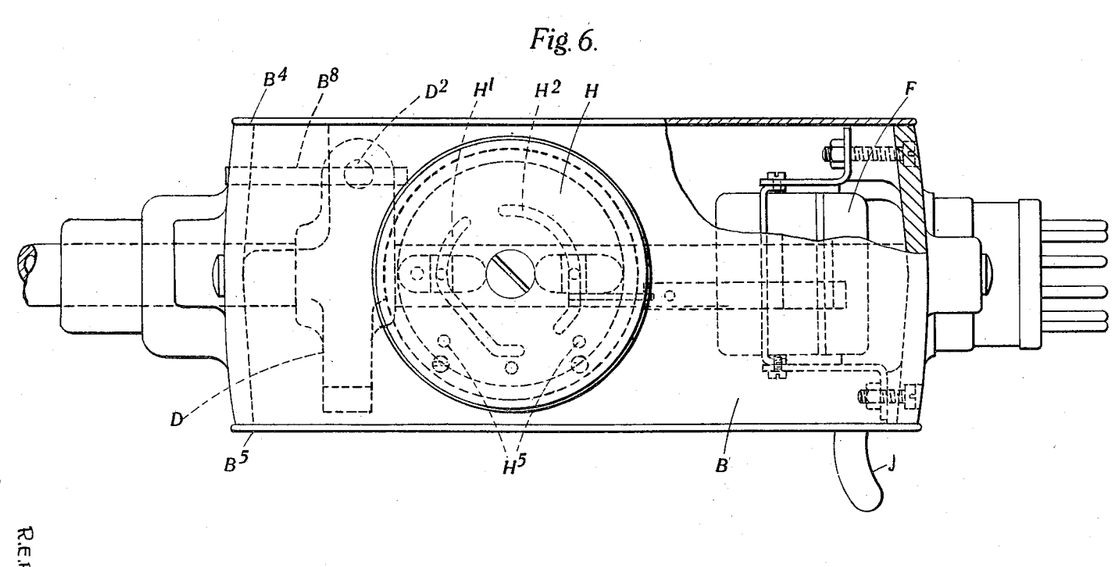
Figure 6 is a plan of the unit.

The pick-up head C is mounted on the end of a hollow horizontal bar $C^1$ adjustable horizontally in a bracket $C^2$ connected to a hollow shaft D projecting through the side wall of the casing, so that the head C and shaft D can move together relatively to the casing. The shaft D, which passes across the bottom of the casing, has secured to it a bracket $D^1$, from the back of which a rod $D^2$ extends upwardly to engage at its forked upper end with a guide $B^8$ (see Figures 5 and 6), thereby holding the shaft D against rotation during its longitudinal traversing movement.

The traversing movement of the shaft D is effected by means of a half-nut $D^3$ engaging with a driving screwthread E mounted in the casing above the shaft D. This half-nut $D^3$ is supported by the bracket $D^1$ and is pressed into engagement with the screwthread by a spring $D^4$, a stud $D^5$ projecting downwardly from the half-nut into a keyway in the bracket $D^1$ to hold the half-nut against rotation.

The power for driving the screwthread E is derived through variable speed gearing from an electric motor F secured in the casing $B^1$ on a fixed horizontal shaft $F^1$ extending across the casing above the shaft $E^1$ of the screwthread E. The variable speed gearing may be arranged in various ways, but in the example illustrated there are three speeds available, one relatively fast and the other two relatively slow.

The driving shaft of the motor F is connected through an Oldham's coupling $F^2$ to a pair of driving pinions $F^3$, $F^4$ slidable together along the fixed shaft $F^1$. The larger pinion $F^3$ of the pair can engage with or be disengaged from a pinion $E^2$ fixed to the shaft $E^1$ of the driving screwthread, this connection affording the desired fast speed drive. The smaller driving pinion $F^4$ remains always in driving engagement through reduction gears $F^5$, $F^6$, $F^7$ with a pinion $G^1$ rotatably mounted on a sleeve G slidable along the shaft $F^1$, the gears $F^5$, $F^6$ being freely mounted on the shaft $E^1$ whilst the gear $F^7$ is fast with the pinion $G^1$. The sleeve G also carries a second pinion $G^2$ of the same size as the pinion $G^1$ and driven therefrom through reduction gears $G^3$, $G^4$, $G^5$, of which the gears $G^3$, $G^4$ are carried by a lay shaft $G^6$ suitably journalled in the casing whilst the gear $G^5$ is fast with the pinion $G^2$. The two sets of reduction gears remain always in mesh during sliding movements of the driving pinions $F^3$, $F^4$ and of the sleeve G, so that the pinions $G^1$, $G^2$ are permanently geared to the motor shaft. By moving the sleeve G in one direction or the other from an inoperative central position, the pinions $G^1$, $G^2$ can selectively be brought into engagement with a further pinion $E^3$ fixed to the shaft $E^1$ of the driving screwthread in order to afford the alternative slow speed drives.

The control of the gear ratio is effected by a knurled knob H at the top of the casing, this knob having four positions, namely a disengaged position (in which the mechanism is shown in the drawings), a fast speed position, and two slow speed positions. This knob H has two shaped slots $H^1$, $H^2$ cut in its undersurface and the rounded upper ends of two pivoted levers $H^3$, $H^4$ respectively engage in these slots, the lever $H^3$ serving to operate the sleeve G for the two slow speeds, and the lever $H^4$ the pair of pinions $F^3$, $F^4$ for the fast speed. Spring-pressed plungers $H^5$ are provided to hold the knob H in its four positions. The shapes of the slots $H^1$, $H^2$ (see Figure 6) are such that by rotating the knob H counterclockwise through 45° from the inoperative position the lever $H^4$ will be rocked to move the pinion $F^3$ into engagement with the fast speed pinion $E^2$, the lever $H^3$ remaining stationary, whilst, by rotating the knob H in the clockwise direction through either 45° or 90°, the lever $H^4$ will remain stationary and the lever $H^3$ will move the sleeve G to bring either the pinion $G^1$ or the pinion $G^2$ into engagement with the slow speed pinion $E^3$ to give the alternative slow speed drives.

Although a reversing motor may be employed, it will usually be preferable for the motor to drive the pick-up head in the forward direction only, the screwthread E being provided with asymmetrical teeth, after the manner of a ratchet, so that the half-nut $D^3$ can slide freely over the thread when the pick-up head moves in the reverse direction, to facilitate quick resetting. A spring $D^4$ is provided to hold the half-nut $D^3$ against the thread E, this arrangement having the advantage that, should the shaft D happen to stick, the thread will ratchet idly without risk of damage to the parts.

To effect starting and resetting, a lever J is provided. This lever is pivoted at $J^1$ near the back of the casing and passes through the front cover plate $B^5$. It is provided with a flat $J^2$ for engaging with a projection $D^7$ on the shaft D. Thus to effect starting of a traverse, the lever J is first moved from its normal position to the left to engage with the projection $D^7$ and thereby to reset the shaft D and the pick-up head C, and is then moved back again to its normal position to operate contacts for starting up the motor F.

Figure 7:
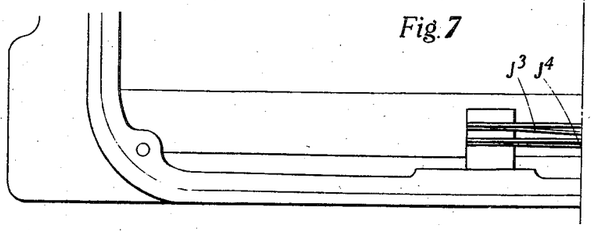
Figures 7–9 are diagrammatic views showing the operation of electrical contacts employed in the unit, Figure 7a being a continuation of Figure 7.
Figure 8:
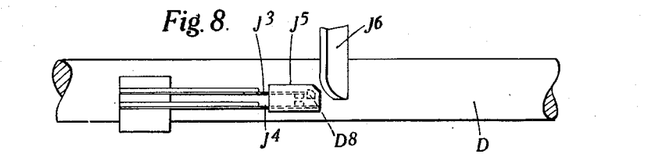
Figure 9:
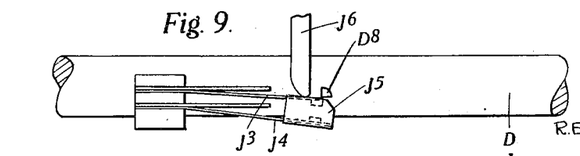

The arrangement of these starting contacts will now be described with reference to Figures 4, 7, 8 and 9, Figure 7 showing the parts in the position when the motor is just starting up after operation of the starting lever, Figure 8 the position occupied at the end of a traverse, and Figure 9 the position after the resetting movement of the lever and before the return starting movement. The contacts comprise an upper spring contact blade $J^3$ and a cooperating lower spring contact blade $J^4$, the latter having a lateral upward projection $J^5$ extending up to approximately the same level as the lower blade. The spring contacts $J^3$ and $J^4$ are carried by the casing $B^1$. The upper blade $J^3$ and the projection $J^5$ on the lower blade are simultaneously operated by a downwardly extending finger $J^6$ on the starting lever J, whilst a laterally projecting stud $D^8$ on the shaft D can operate the upper blade $J^3$ but not the lower blade $J^4$.

Figure 1:
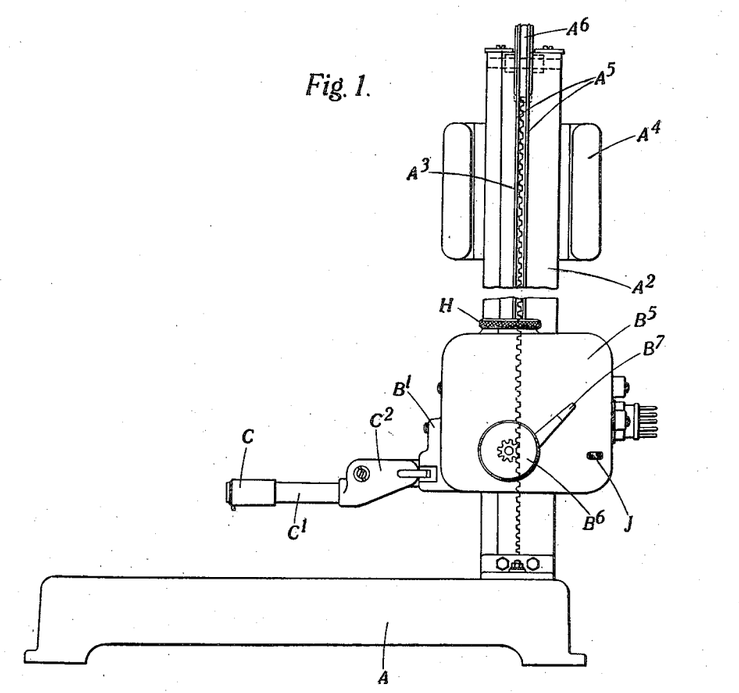
Figures 1 and 2 are respectively a front elevation and a plan of the preferred construction of unit and of one convenient mounting therefor, Figures 3 and 3a together are a central vertical section on a larger scale of the unit viewed from the front, Figure 3a being a continuation of Figure 3.
Figure 2:
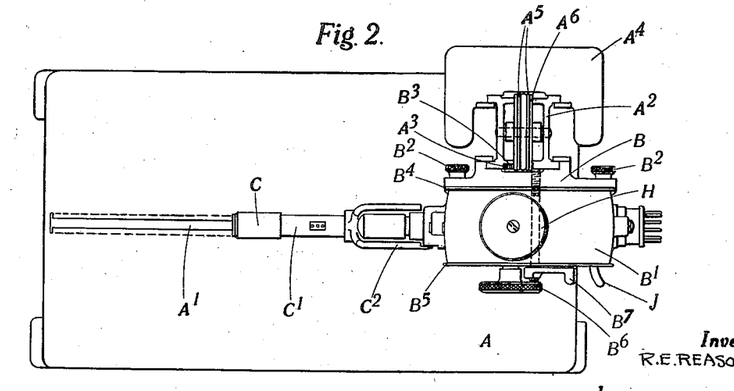
Figure 3:
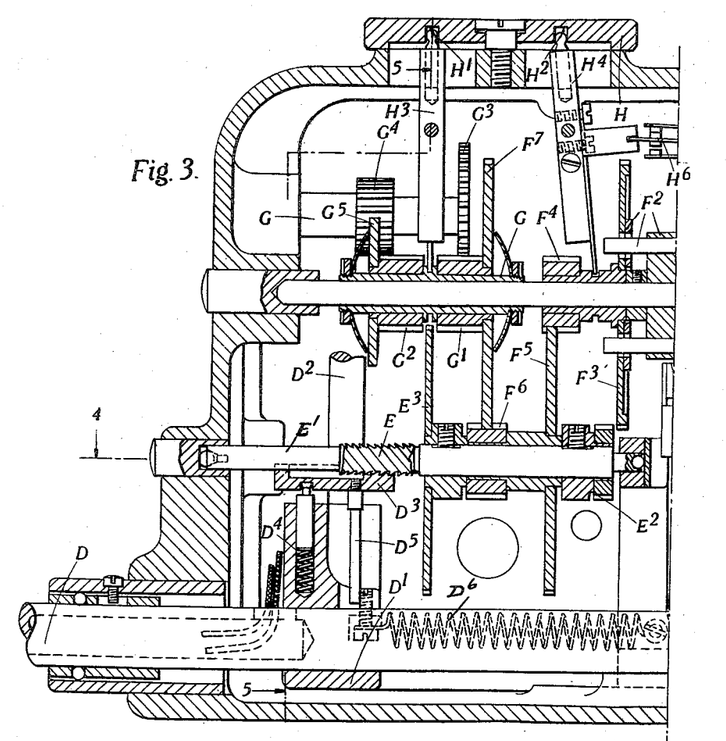
Figures 3A, 7A, 10:
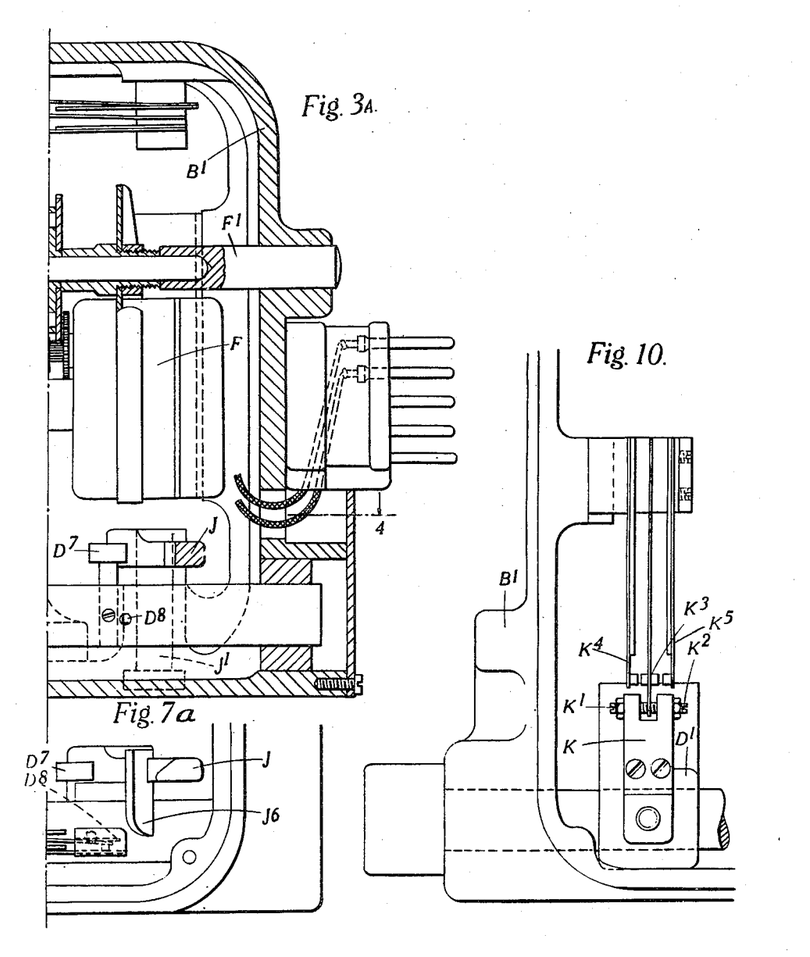
Figure 4:
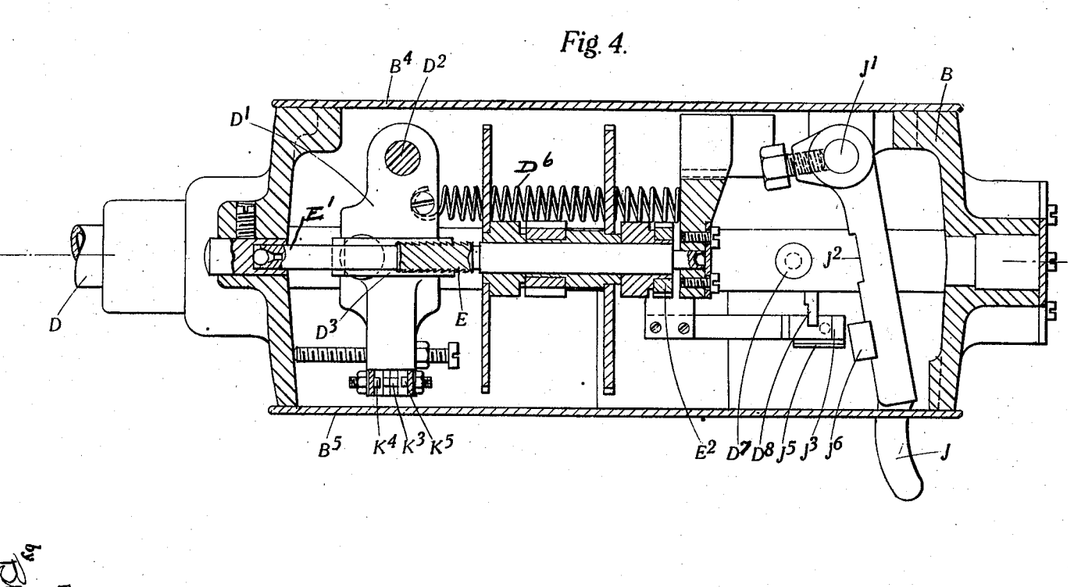
Figure 4 is a horizontal section on the broken line 4—4 of Figure 3.

Thus in the starting position shown in Figures 4 and 7 the contacts $J^3$, $J^4$ are held closed by the stud $D^8$ and the motor F starts up and drives the shaft D and pick-up head C to the right at the speed determined by the position of the knurled knob H to effect the traverse, which in practice may extend for an eighth of an inch or other desired distance. When the desired distance has been completed the stud $D^8$ runs off the end of the upper blade $J^3$ which rises and opens the contacts, thereby stopping the motor. Figure 8 shows the position of the parts at this stage. When it is desired to effect another traverse, the starting lever J is first moved to the resetting position shown in Figure 9. During this movement the finger $J^6$ on the starting lever first depresses both contacts simultaneously and therefore holds them open, and then the flat J² on the lever engages the projection D⁷ on the shaft and resets the shaft to the starting position, thus moving the stud D⁸ over the upper contact J³. The starting lever J is now moved again to the right, releasing the lower contact J⁴, and therefore closing the contacts, the stud D⁸ holding the upper contact depressed. This brings the parts back again to the position shown in Figures 4 and 7.

With some constructions of motor difficulty sometimes arises from overheating, owing to the relatively wide difference in the loads during fast and slow speed traverses. This can be overcome by using a higher operating voltage, say 20 volts, for the fast-speed traverse and a lower voltage, say 14 volts, for the slow speed traverses, and to effect the voltage change, a change-over switch H⁶, operated by the lever H⁴ simultaneously with the fast speed gear change, may be used.

The bracket D¹ on the shaft D is also used for operating contacts and for this purpose is provided with an insulating block K carrying studs K¹, K² engaging with opposite sides of a spring contact blade K³, which cooperates with two further spring contact blades K⁴, K⁵. Thus the contacts K³, K⁴ are closed at the beginning of a traversing movement and open shortly afterwards, whilst the contacts K³, K⁵ close shortly before the end of the movement, both sets of contacts being open during that portion of the movement during which the pick-up head is moving at substantially constant speed, that is after the initial acceleration from rest and before the final deceleration to rest. These contacts serve to control part of the associated measuring apparatus, as described below.

Figure 11:
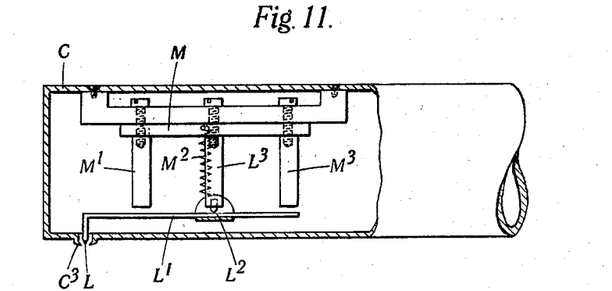
Figures 11–12 illustrate the pick-up head.
Figure 12:
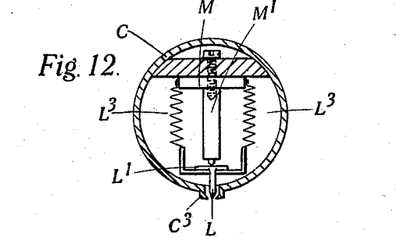

The pick-up head C itself may be arranged in various ways, but one convenient form is shown on a larger scale in Figures 11 and 12. The lower part of the head C is formed as a "presser foot" or skid C³ to engage the surface under investigation over an extended area sufficient to cover several "crests" of roughness and thus to provide a datum line relatively to the point of the stylus L, which projects downwardly through the presser foot on to the surface. The stylus L is carried by the armature L¹ of an electromagnetic device mounted in the head, the device preferably being of such a nature that movement of the armature as the stylus is traversed over the surface varies the inductance of a coil to which can be applied a carrier current having a frequency high as compared with the principal frequencies in the movements of the stylus normal to the surface.

In the construction shown the electromagnetic device is of the differential type and consists of a yoke M having three parallel limbs M¹, M², M³ arranged side by side so as to form a substantially E-shaped core structure. The armature L¹ extends past all three limbs and is pivoted on a knife-edge L² projecting from the centre limb M² against which it is held by springs L³. The core structure with the armature constitutes two magnetic circuits, with the centre limb M² common to the two circuits. The two outer limbs M¹, M³ each carry primary windings (omitted from the drawings for the sake of clearness) whilst the centre limb M² carries a secondary winding. Movements of the stylus normal to the surface will vary the reluctance of the two magnetic circuits in opposite senses and will thus control the output from the secondary winding. The wall of the pick-up head C is preferably made of high permeability iron so as to provide magnetic screening.

The measuring apparatus, to which the secondary output of the pick-up is applied, in itself forms no part of the present invention, but is preferably of one or other of the kinds described in the present applicant's United States of America Patent Applications Serial Nos. 381,920 and 378,836, filed Mar. 5, 1941 and Feb. 13, 1941, respectively.

It will be appreciated that the pick-up unit according to the invention may be employed with other forms of measuring apparatus, and further that the unit itself may be arranged in ways other than that above described.

Figure 13:
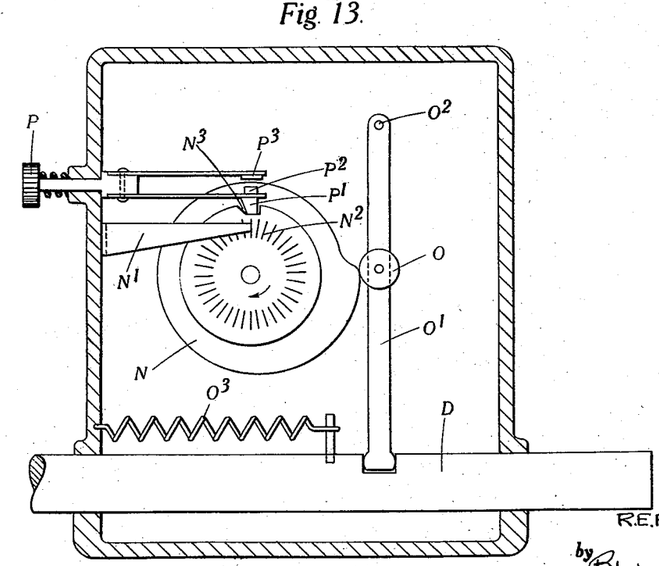
Figure 13 shows somewhat diagrammatically the modified construction.

Thus, for instance, instead of employing a screwthread and half-nut for transmitting the drive from the variable speed gear to the shaft carrying the pick-up head, the motor may act through the variable speed gear (as shown in Figure 13) to drive a rotary cam N acting on a roller O carried by a lever O¹ which is pivoted at O² and acts at its free end on the shaft D, a spring O³ (which tends to move the shaft D in the resetting direction) being provided for holding the roller O in engagement with the cam N. The cam is so shaped that one complete revolution serves both for the forward traverse of the shaft D and for a quick return movement thereof for resetting purposes, a ratchet device N¹, N² being provided to ensure that the cam can be driven in one direction only.

With this arrangement starting may be effected by means of a push-button P provided with a detent P¹ engaging in a recess N³ in the periphery of the ratchet disc N², the arrangement being such that depression of the button P drives the cam forward to the extent of, say, one ratchet tooth and thereby effects the quick resetting movement, whilst release of the button P brings the detent P¹ out of the recess N³ and thereby closes starting contacts P², P³ in the motor circuit, such circuit being broken to stop the motor by reengagement of the detent in the recess at the end of the complete revolution.

What I claim as my invention and desire to secure by Letters Patent is:

1. A pick-up unit for use in apparatus for measuring the degree of roughness of a surface, comprising in combination a casing, means whereby the casing can be located in a chosen position relatively to the surface under investigation, a pick-up head carried by the casing and movable relatively thereto, an electric motor fixed relatively to the casing, variable speed gearing through which the motor acts to drive the pick-up head relatively to the casing in one direction substantially parallel to the surface at any one of a plurality of different speeds, a ratchet-like device incorporated in the drive between the gearing and the pick-up head for permitting relatively quick resetting of the head to the starting position, contacts controlling the motor circuit, a starting lever for resetting the head to the starting position and operating the contacts to start the motor, and means for automatically operating the contacts to stop the motor, when the head has travelled a predetermined distance.

2. A pick-up unit for use in apparatus for measuring the degree of roughness of a surface, comprising in combination a casing, means whereby the casing can be located in a chosen position relatively to the surface under investigation, a pick-up head carried by the casing and movable relatively thereto, an electric motor, variable speed gearing, a rotary member journaled in the casing and driven in one direction by the motor through the gearing, means whereby such member during the major portion of one revolution acts to drive the pick-up head relatively to the casing in one direction substantially parallel to the surface, means for automatically stopping the drive at the end of such movement, a starting device for causing the rotary member to perform the remaining small portion of the one revolution, means whereby such further movement of the rotary member causes the pick-up head to be quickly reset to its starting position, and means for restarting the motor when the pick-up head has been reset.

3. A pick-up unit for use in apparatus for measuring the degree of roughness of a surface, comprising in combination a casing, means whereby the casing can be located in a chosen position relatively to the surface under investigation, a pick-up head carried by the casing and movable relatively thereto, a source of power, variable speed gearing carried by the casing and interposed between the source of power and the pick-up head whereby the pick-up head can be driven relatively to the casing in one direction substantially parallel to the surface at any one of a plurality of different speeds, means incorporated in the drive whereby the pick-up head can be reset relatively quickly to the starting position, a starting device for controlling such resetting movement and for starting the drive in the forward direction over the surface, and means for automatically stopping the drive when the pick-up head has travelled a predetermined distance over the surface.

4. A pick-up unit as claimed in claim 3, in which the starting device has two operative positions, a normal position and a resetting position, the arrangement being such that movement of the device into the resetting position causes the pick-up head to be reset to its starting position, whilst movement of the device back to its normal position effects starting of the drive.

RICHARD EDMUND REASON.